US008749810B2

(12) United States Patent
OHara et al.

(10) Patent No.: US 8,749,810 B2
(45) Date of Patent: Jun. 10, 2014

(54) CONTENTS PROVIDING SYSTEM, PRINTING APPARATUS, AND PROGRAM THEREFOR

(75) Inventors: Kiyotaka OHara, Aichi (JP); Makoto Matsuda, North Brunswick, NJ (US); Kazuma Aoki, Aichi (JP); Satoshi Watanabe, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1411 days.

(21) Appl. No.: 11/513,237

(22) Filed: Aug. 31, 2006

(65) Prior Publication Data

US 2007/0046991 A1 Mar. 1, 2007

(30) Foreign Application Priority Data

Aug. 31, 2005 (JP) ................................. 2005-251784

(51) Int. Cl.
*G06F 3/12* (2006.01)

(52) U.S. Cl.
USPC ........... 358/1.15; 358/1.1; 358/1.13; 709/219

(58) Field of Classification Search
USPC ................................. 347/7; 358/1.15; 705/35
See application file for complete search history.

(56) References Cited

U.S. PATENT DOCUMENTS 6,507,409 B2 * 1/2003 Kawaguchi .................. 358/1.16
6,731,729 B2 * 5/2004 Eng et al. ................. 379/121.03
6,903,836 B2 * 6/2005 Meade et al. ................ 358/1.15
6,980,311 B1 * 12/2005 Currans et al. ............... 358/1.15
6,999,190 B2 * 2/2006 Shimbori et al. ............ 358/1.15
7,006,243 B2 * 2/2006 Simpson et al. ............. 358/1.18
7,027,175 B2 * 4/2006 Robertson .................... 358/1.15
7,127,433 B2 * 10/2006 Baker ........................... 705/400
7,191,448 B2 * 3/2007 Simpson et al. .............. 719/311
7,202,966 B2 * 4/2007 Nunokawa ................... 358/1.15
7,266,590 B2 * 9/2007 Nakaoka et al. .............. 709/219
7,272,647 B2 * 9/2007 Haraguchi et al. ............ 709/224
7,317,549 B2 * 1/2008 Naito ........................... 358/1.15
7,370,090 B2 * 5/2008 Nakaoka et al. .............. 709/219

(Continued)

FOREIGN PATENT DOCUMENTS

CN 1392496 A 1/2003
JP 2001-75996 A 3/2001

(Continued)

OTHER PUBLICATIONS

Chinese Office Action issued in Chinese Patent Application No. CN 200610126441.1 dated Aug. 3, 2007.

(Continued)

*Primary Examiner* — Ashish K Thomas
(74) *Attorney, Agent, or Firm* — Scully, Scott, Murphy & Presser PC

(57) ABSTRACT

A contents providing system, comprising an application server, a printing apparatus, and an accounting server which are interconnected through a network, is provided. The application server comprises an application server-side transmitting system, which transmits print data including contents information and contents supplier identifying information identifying a supplier of the contents information to the printing apparatus. The printing apparatus comprises a printing apparatus-side receiver system, a printing system, an obtaining system, and a printing apparatus-side transmitting system. The accounting server comprises an accounting server-side receiver system, an accounting server-side accounting system, and an accounting server-side storing system.

3 Claims, 7 Drawing Sheets

(56) References Cited

U.S. PATENT DOCUMENTS

| | | | | |
|---|---|---|---|---|
| 7,701,595 | B2 * | 4/2010 | Carling et al. | 358/1.13 |
| 7,948,644 | B2 * | 5/2011 | Carling et al. | 358/1.13 |
| 2001/0029466 | A1 | 10/2001 | Ichihara | |
| 2002/0051164 | A1 | 5/2002 | Watanabe et al. | |
| 2002/0076245 | A1 * | 6/2002 | Aiyama | 400/61 |
| 2002/0174104 | A1 * | 11/2002 | Yokoyama | 707/1 |
| 2002/0191039 | A1 * | 12/2002 | Minowa et al. | 347/7 |
| 2004/0230505 | A1 * | 11/2004 | Garlich et al. | 705/35 |
| 2007/0162480 | A1 * | 7/2007 | Garg et al. | 707/101 |
| 2007/0177197 | A1 * | 8/2007 | Murahashi et al. | 358/1.15 |

FOREIGN PATENT DOCUMENTS

| | | | |
|---|---|---|---|
| JP | 2001-229246 | A | 8/2001 |
| JP | 2001-291003 | A | 10/2001 |
| JP | 2001-306315 | A | 11/2001 |
| JP | 2002-149545 | A | 5/2002 |
| JP | 2003-216855 | A | 7/2003 |

OTHER PUBLICATIONS

Japanese Office Action issued in Patent Application No. JP 2005-251784 dated on May 27, 2008.

* cited by examiner

PRINT DATA

```
<pagedata>
 <fragment>
  <supplierID>126740</supplierID>
  <contentsData>Contents Data</contentsData>
 </fragment>
 <fragment>
  <supplierID>799014</supplierID>
  <contents Data>Contents Data</contentsData>
 </fragment>
</pagedata>
```

FIG. 2

| SUPPLIER ID | SUM OF AREAS PRINTED IN C | SUM OF AREAS PRINTED IN M | SUM OF AREAS PRINTED IN Y | SUM OF AREAS PRINTED IN K | ACCOUNT NUMBER |
|---|---|---|---|---|---|
| 12674 | 5980 | 10783 | 356 | 3568528 | 09-1339-11 |
| 799014 | 9873 | 35638 | 80745682 | 256826 | 970-1339-965 |
| 69837 | 3456 | 5673 | 3567 | 25682 | 991-16873 |
| ⋮ | ⋮ | ⋮ | ⋮ | ⋮ | ⋮ |

FIG. 9

CONTENTS PROVIDING SYSTEM, PRINTING APPARATUS, AND PROGRAM THEREFOR

CROSS REFERENCE TO RELATED APPLICATION

This application claims priority from Japanese Patent Application No. 2005-251784, filed on Aug. 31, 2005, the entire subject matter of which is incorporated herein by reference.

BACKGROUND

1. Technical Field

Aspects of the invention relate to a contents providing system capable of providing printable information to users.

2. Related Art

Conventionally, various information to be used by users (i.e., contents information) is offered to the users through networks such as the Internet. An example of a contents providing system to offer such contents information is disclosed in Japanese Patent Provisional Publications No. 2001-75996. The contents providing system in the publication includes a server storing a plurality of contents and communication terminals that are connected with the server via a communication line so that the contents can be delivered through the communication line to the terminal devices when the contents are selected.

SUMMARY OF THE INVENTION

In view of the foregoing issues, aspects of the present invention are advantageous in that a contents providing system capable of collecting information necessary for the providers of the printing apparatuses to evaluate the contents suppliers so that the contents suppliers can be fairly rewarded by participating in the contents providing system is provided. Further, the printing apparatus to be included in the contents providing system is provided.

BRIEF DESCRIPTION OF THE ACCOMPANYING DRAWINGS

FIG. 2 is a diagram to illustrate a component of print data according to the embodiment of the invention.

FIG. 9 illustrates a summary table according to the embodiment of the invention

DETAILED DESCRIPTION

Figure 1:
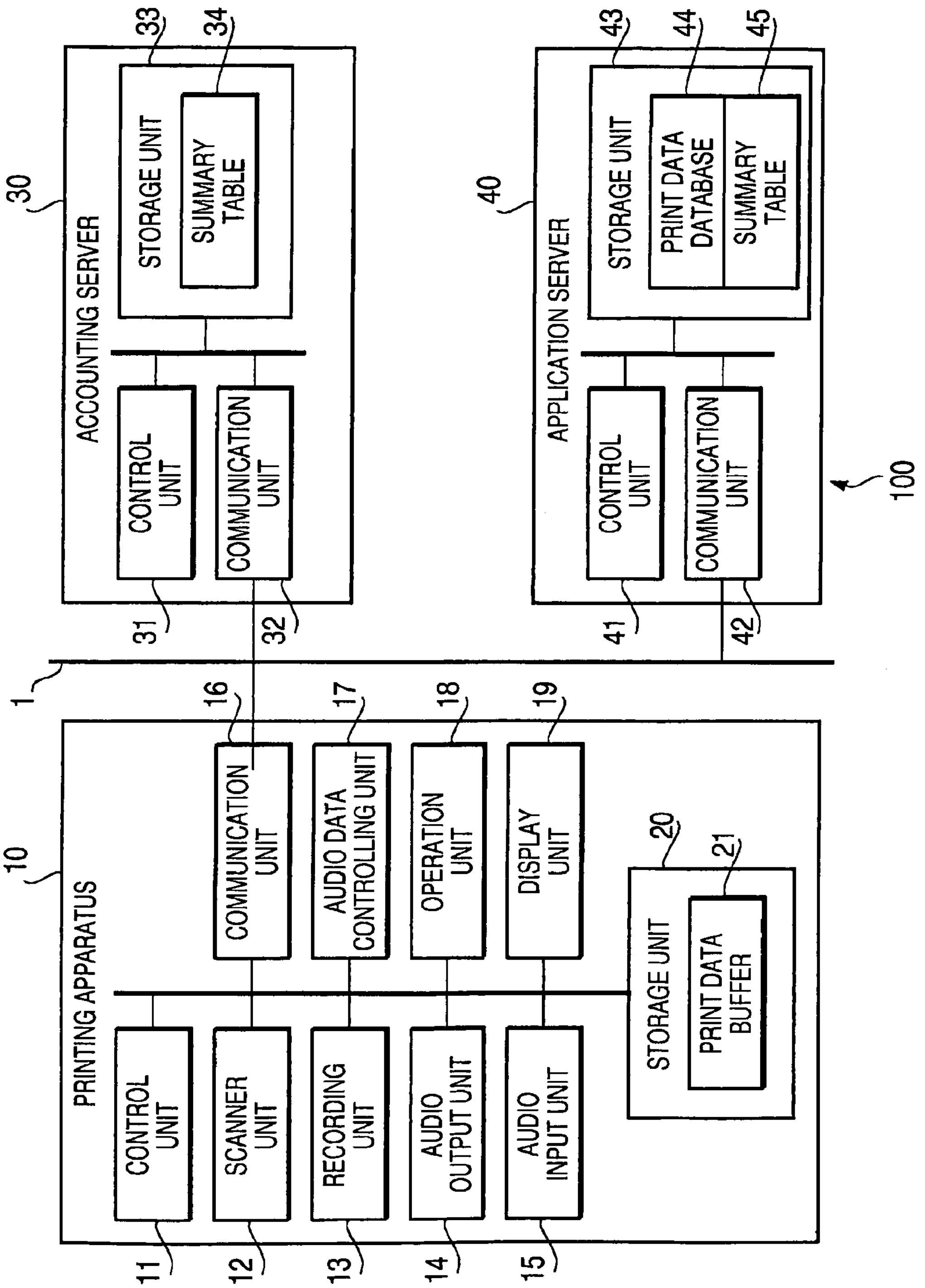
FIG. 1 is a block diagram to illustrate a contents providing system according to an embodiment of the invention.

General Overview of Aspects of the Invention

The following describes general aspects of the invention that may or may not be comprised in various embodiments and modifications. It should be noted that various connections are set forth between elements in the following description. These connections, in general and, unless specified otherwise, may be direct or indirect and this specification is not intended to be limiting in this respect.

According to some aspects of the present invention, a contents providing system is provided. The contents providing system comprises an application server, a printing apparatus, and an accounting server which are interconnected through a network. The application server is provided with an application server-side transmitting system, which transmits print data including contents information and contents supplier identifying information identifying a supplier of the contents information to the printing apparatus. The printing apparatus is provided with a printing apparatus-side receiver system, which receives the print data transmitted from the application server-side transmitting system, a printing system, which forms an image based on the contents information included in the print data received by the printing apparatus-side receiver system, an obtaining system, which obtains consumable material information concerning an amount of a consumable material composed in the printing apparatus and used during an printing operation to form the image based on the contents information, and a printing apparatus-side transmitting system, which transmits the consumable material information obtained by the obtaining system and the contents supplier identifying information being associated with the consumable material information to the accounting server. The accounting server is provided with an accounting server-side receiver system to receive information, an accounting server-side accounting system, which generates summed information wherein the consumable material information transmitted from the printing apparatus and received by the accounting server-side receiver system is summarized to be in correspondence with the contents supplier identifying information being associated with the consumable material information, and an accounting server-side storing system, wherein the summed information generated by the accounting server-side accounting system is stored.

It should be noted that, in the contents providing system described above, a number of the application server is not limited to one, but may be two or more. Similarly, two or more accounting server may be provided to the contents providing system.

It should be also noted that the consumable material composed in the printing apparatus and used during an printing operation refers to image forming materials such as ink and toner, other exchangeable or replenished components that are consumed during the printing operation. Recording medium such as recording paper is not included in the consumable material composed in the printing apparatus.

The amount of consumable material refers to, for example, a consumed amount of the ink and the toner, an area to be printed and a number of pixels to be printed, from which a consumed amount of the ink and toner can be estimated when the consumable material is ink and toner. When the consumable material is an exchangeable component, which requires replacement after a predetermined number of printing operations or after a predetermined dimensions are printed, the amount of consumable material can refer to the number of printing operations and the dimensions to be printed.

The consumable material information obtained by the obtaining system may include information concerning an amount of ink and toner that were actually used in printing the contents information. Further, the consumable material information may include information concerning an amount of ink and toner calculated from the print data prior to the printing operation to print the contents information.

According to the contents providing system described above, the consumable material information concerning an amount of the consumable material used during the printing operation is obtained so that the obtained consumable material information can be summarized by the accounting server on a contents supplier basis.

The summarized results can be then used to evaluate the contents suppliers participating in the contents providing system in a fair manner. Thus, the contents suppliers can be fairly evaluated and rewarded based on contribution to the sales of the image forming materials used in the printing apparatus of the contents providing system.

Thus, an environment wherein the contents suppliers can easily participate can be offered to the contents suppliers. Further, more contents data can be supplied to the contents providing system by the contents suppliers so that the contents providing system can become more beneficial to users. Thus, opportunities wherein the users output the contents data by using the printing apparatus are increased.

Optionally, the printing apparatus-side transmitting system may transmit the consumable material information obtained by the obtaining system to the application server as a sender of the print data including the contents information corresponding to the consumable material information. The application server may be provided with an application server-side receiving system to receive information, an application server-side accounting system, which generates summed information wherein the consumable material information transmitted from the printing apparatus and received by the application server-side receiver system is summarized, and an application server-side storing system, wherein the summed information generated by the application server-side accounting system is stored.

According to the above configuration, the consumable material information obtained in the printing apparatus is distributed to the application server that provides the contents information as well as to the accounting server.

Thus, as the contents suppliers are rewarded based on the consumable material information summarized by the accounting server, the contents suppliers can confirm particulars of the reward by viewing the consumable material information. Accordingly, the contents suppliers participating in the contents providing system can be benefited in a fair manner.

As the consumable material information is transmitted to the application server, the consumable material information can be associated with the contents supplier identifying information that corresponds to the contents data to be printed when a plurality of pieces of contents data which are respectively provided from different contents suppliers are distributed from one application server. In such a case, the application server can be configured to summarize the consumable material information transmitted from the printing apparatus to be in association with the contents supplier identifying information corresponding to the consumable material information.

According to another aspects of the present invention, a printing apparatus for printing an image according to print data including contents information and contents supplier identifying information to identify a supplier of the contents information, is provided. The printing apparatus comprises a printing apparatus-side receiver system, which receives the print data from an application server, a printing system, which forms an image based on the contents information included in the print data received by the printing apparatus-side receiver system, an obtaining system, which obtains consumable material information concerning an amount of consumable material composed in the printing apparatus and used during an printing operation to form the image based on the contents information, and a printing apparatus-side transmitting system, which transmits the consumable material information obtained by the obtaining system and the contents supplier identifying information being associated with the consumable material information to an accounting server connected to the printing apparatus through a network.

According to the configuration of the image printing apparatus described above, the advantages achieved in the contents providing system as described above can be similarly achieved.

According to still another aspects of the present invention, a computer usable medium comprising computer readable instructions is provided. The computer readable instructions cause a computer to execute steps of receiving print data including contents information and contents supplier identifying information that identifies a supplier of the contents information, printing an image based on the contents information included in the print data which is received in the receiving step, obtaining consumable material information concerning an amount of consumable material used during the printing step to form the image based on the contents information, and transmitting the consumable material information obtained in the obtaining step and the contents supplier identifying information being associated with the consumable material information to an accounting server connected with the computer through a network.

According to the computer program described above, the advantages achieved in the printing apparatus as described as above can be similarly achieved. Further, the computer program can be distributed through a communication network. Furthermore, it should be noted that exchanging computer programs is relatively easy compared to exchanging hardware components, and thus functionalities of the printing apparatus can be easily improved by exchanging the computer programs.

Embodiment

Hereinafter referring to the accompanying drawings, a contents providing system according to an embodiment of the invention will be described.

FIG. 1 is a block diagram to illustrate a contents providing system 100 according to an embodiment of the invention. The contents providing system 100 includes a printing apparatus 10, an accounting server 30, and an application server 40, which are bi-directionally communicably connected via a network 1. The network 1 in the present embodiment is a wide area network such as the Internet.

The printing apparatus 10 is provided with a plurality of functions including a telephone (audio communication) function, a scanning function, a printing function, a copying function, and a facsimile transmission/reproduction function. The printing apparatus 10 can use a plurality of services concerning the above functions offered in the contents providing system 100 through the network 1. More specifically, the printing apparatus 10 requests the application server 40 for contents information so that the contents information transmitted from the application server 40 and received in the printing apparatus 10 can be output to be printed by the printing apparatus 10. In the contents providing system 100 of the present embodiment, information regarding consumable materials used for printing the contents information can be transmitted to the accounting server 30 and the application server 40.

Next, a configuration of the printing apparatus 10 will be described. The printing apparatus 10 is provided with a control unit 11, a scanner unit 12, a recording unit 13, an audio output unit 14, an audio input unit 15, a communication unit 16, an audio data controlling unit 17, an operation unit 18, a display unit 19, and a storage unit 20.

The controlling unit 11 is provided with a known CPU (not shown), which controls each of the units described above, a ROM (not shown), and a RAM (not shown). In the ROM, programs to cause the CPU to execute various processes (see FIGS. 3-5) are stored.

The scanner unit 12 is adapted to read an image formed on a recording medium such as a recording sheet paper and generates image data indicating the image. The printing unit 13 forms an image on a recording medium such as a recording sheet paper by providing and fixing image forming material such as ink and toner in one or more colors onto a surface of the recording medium.

The audio output unit 14 outputs sound indicated by audio data such as PCM (pulse-code modulation) data through a speaker equipped in a handset (not shown) of the printing apparatus 10. The sound may be output through a speaker (not shown) equipped in a body of the printing apparatus 10.

The audio input unit 15 inputs sound from a microphone (not shown) equipped in the handset (a receiver, not shown) of the printing apparatus and generates audio data (PCM data) indicating the inputted sound. The communication unit 16 transmits and receives various data through the network 1.

The audio data controlling unit 17 controls inputting audio data (PCM data) from an external environment and outputting audio data (PCM data) to the external environment. The operation unit 18 is used to input an operation from a user through an operation panel (not shown) equipped on the body of the printing apparatus 10.

The display unit 19 is provided with a display panel (not shown) equipped on the body of the printing apparatus 10, on which information for the user to view is displayed. The storage unit 20 is provided with a nonvolatile RAM (not shown), wherein various data is stored. More specifically, the storage unit 20 is provided with a print data buffer 21, which temporarily stores data including data for printing.

Next, a configuration of the accounting server 30 will be described. The accounting server 30 is configured to be a computer having a substantial processing capability and includes a control unit 31, a communication unit 32, and a storage unit 33.

The controlling unit 31 is provided with a known CPU (not shown), which controls each of the units described above, a ROM (not shown), and a RAM (not shown). In the ROM, a program to cause the CPU to execute an application process (see FIG. 6) is stored.

The communication unit 32 processes data to be transmitted to and received in the accounting server 30 via the network 1. The storage unit 33 is provided with an HDD (hard disk drive, not shown), wherein various data is stored. More specifically, a summary table 34, which will be described later, is stored in the storage unit 33.

Next, a configuration of the application server 40 will be described. The application server 40 is configured to be a computer having a substantial processing capability and includes a control unit 41, a communication unit 42, and a storage unit 43.

The controlling unit 41 is provided with a known CPU (not shown), which controls each of the units described above, a ROM (not shown), and a RAM (not shown). In the ROM, programs to cause the CPU to execute various processes (see FIGS. 7 and 8) are stored.

The communication unit 42 processes data to be transmitted to and received in the application server 40 via the network 1. The storage unit 43 is provided with an HDD (not shown), wherein various data is stored. More specifically, a print data DB (database) 44 and a summary table 45 are stored in the storage unit 43.

The print data DB 44 is a database wherein data for printing (print data) including contents information (contents data) to be delivered to the printing apparatus 10 is aggregated. As the print data is delivered to the printing apparatus 10 in response to a request from the printing apparatus 1, the contents data is processed to be printed.

Hereinafter, referring to FIG. 2, an example of the print data will be explained. FIG. 2 is a diagram to illustrate a component of the print data according to the embodiment of the invention. The print data is described in XML (extensible markup language), and a piece of print data is defined by <pagedata> tags. Further, the piece of page data is divided into a plurality (two in FIG. 2) of smaller pieces (fragments) which are defined by <fragment> tags. The contents data which is to be printed by the printing apparatus 10 is contained in the fragments.

In each fragment, a supplier ID, which identifies a supplier of the contents data contained in the fragment, is defined by <supplierID> tags. Further, the contents data is defined by <contentsData> tags.

As the print data including the data as described above is delivered from the application server 40 to the printing apparatus 10 in response to the request from the printing apparatus 10, an image indicated by the print data including the contents data is formed by the printing apparatus 10.

With the configuration of the contents providing system 100 of the present embodiment described above, a part of profits concerning consumable materials that a provider of the printing apparatus earned is dispensed as a dividend on a contents supplier basis. Hereinafter, processes to be executed by the printing apparatus 10, the accounting server 30, and the application server 40 in order to dispense the dividend will be described in detail.

Figure 3:
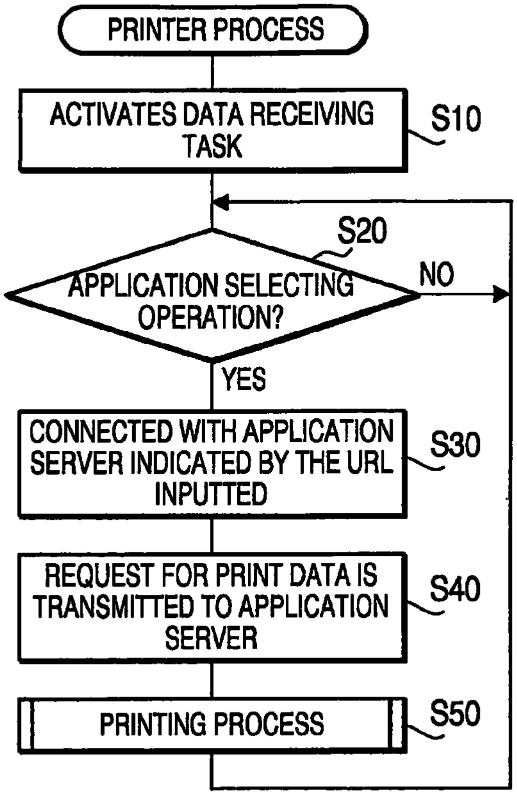
FIG. 3 is a flowchart to illustrate a printer process executed by a control unit 11 of a printing apparatus 10 according to the embodiment of the invention.

First, a printer process to be executed by the printing apparatus 10 will be described. FIG. 3 is a flowchart to illustrate the printer process executed by the control unit 11 of the printing apparatus 10 according to the embodiment of the invention. The printer process is initiated as the printing apparatus 10 is powered on.

As the printer process is initiated, in S10, a data receiving task is activated. The data receiving task is executed in background to receive the print data transmitted through the network 1 to the communication unit 16 of the printing apparatus 10. The data receiving task will be described in detail later.

Next, in S20, determination is made as to whether an operation to select an application (an application selecting operation) is inputted through the operation unit 18 by the user. The application selecting operation includes inputting a URL (uniform resource locator) from which desired contents data is obtained by the printing apparatus as the user operates the operation panel of the operation unit 18. The URL may be previously registered in the printing apparatus 10 so that the user can specify the URL by selecting the desired URL indicated in the operation panel. The URL includes information that specifies the application server 40 to be connected with the printing apparatus 10 and the print data stored in the print data DB 44 of the application server 40.

When the application selecting operation is not inputted (S20: NO), the process repeats S20. When the application selecting operation is inputted (S20: YES), in S30, the printing apparatus 10 is connected with the application server 40 which is indicated by the URL inputted in the application selecting operation.

Next, in S40, a request for the print data is transmitted to the application server 40. The print data transmitted to the printing apparatus 10 in response to the request is stored in the print data buffer 21 during the data receiving task activated in S10. Next, in S50, a printing process is executed based on the received print data, and the process returns to S20. The printing process will be described in detail later.

Figure 4:
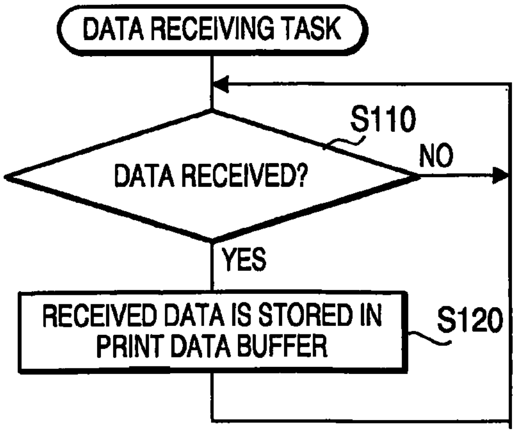
FIG. 4 is a flowchart to illustrate a data receiving task executed by the control unit 11 of the printing apparatus 10 according to the embodiment of the invention.

Hereinafter, referring to FIG. 4, the data receiving task will be described. FIG. 4 is a flowchart to illustrate the data receiving task executed by the control unit 11 of the printing apparatus 10 according to the embodiment of the invention. The data receiving task is activated in S10 of the printer process as described above (see FIG. 3).

In S110, first, determination is made as to whether the print data is received at the communication unit 16 through the network 1. When the print data is not received (S110: NO), S110 is repeated. When the print data is received (S110: YES), in S120, the received data is stored in the print data buffer 21. The process thereafter returns to S110.

Figure 5:
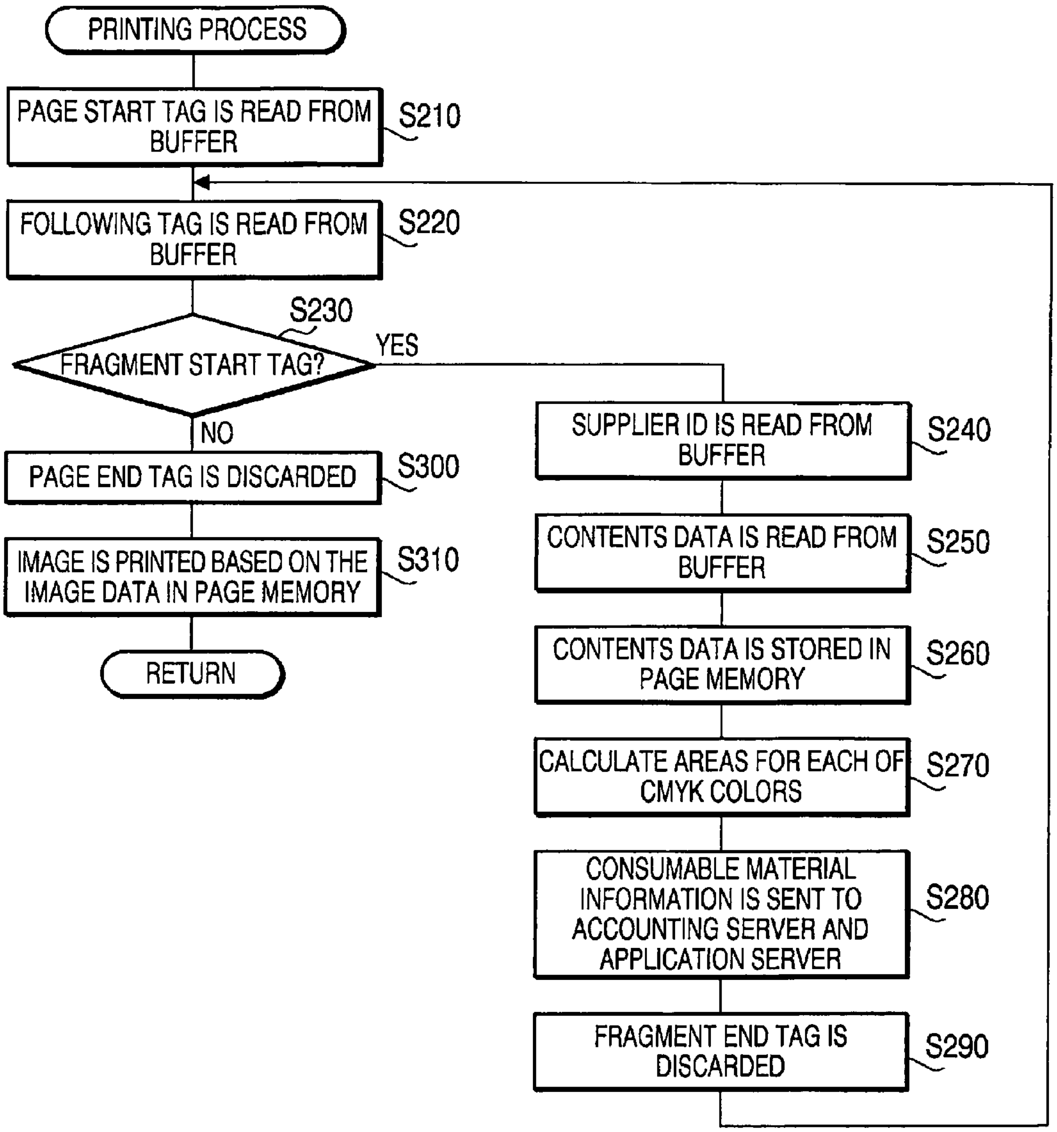
FIG. 5 is a flowchart to illustrate a printing process executed by the control unit 11 of the printing apparatus 10 according to the embodiment of the invention.

Hereinafter, referring to FIG. 5, the printing process will be described in detail. FIG. 5 is a flowchart to illustrate the printing process executed by the control unit 11 of the printing apparatus 10 according to the embodiment of the invention. The printing process is executed in S50 of the printer process as described above (see FIG. 3).

In S210, first, a page start tag, i.e., <pagedata> (see FIG. 2) that indicates a start of the print data, is obtained from the print data buffer 21. Next, in S220, a following tag in the print data is obtained. In S230, determination is made as to whether the tag is a fragment start tag, i.e., <fragment>. When the tag is a fragment start tag (S230: YES), a supplier ID, which is defined by <supplierID> tag in the fragment, is obtained in S240.

Next, in S250, contents data defined by <cantentsData> tag in the fragment is obtained. Thereafter, in S260, the contents data obtained in S250 is converted into image data that is suitable for printing and stores the image data in a page memory as a temporal storage for an image printing operation. Next, in S270, an area printed in each color of C (cyan), M (magenta), Y (yellow), K (black) in the image is calculated based on the image data stored in the page memory. It should be noted that the image is printed by using image forming materials, such as inks and toners, for example, in the CMYK colors, and the larger the area printed in one color is, the larger amount of the image forming material corresponding to the color is consumed as the image is printed.

Next, in S280, the supplier ID obtained in S240 and the information regarding the areas printed in each color (hereinafter referred to as consumable material information) calculated in S170 are transmitted to the accounting server 30 and the application server 40 as a source of the print data. Thereafter, in S290, an end tag in the fragment, i.e., </fragment>, is discarded. The process returns to S230.

In 230, when the tag obtained from the print data buffer is not a fragment start tag (S230: NO), a page end tag, i.e., </pagedata> is discarded in S300. It should be noted that, in the present embodiment, it is assumed that S240 and S250 are applied to all of the fragments contained in the print data, and a page end tag, i.e., </pagedata>, has been obtained in S220. Next, in S310, the image based on the image data stored in the page memory is formed by the recording unit 13.

Figure 6:
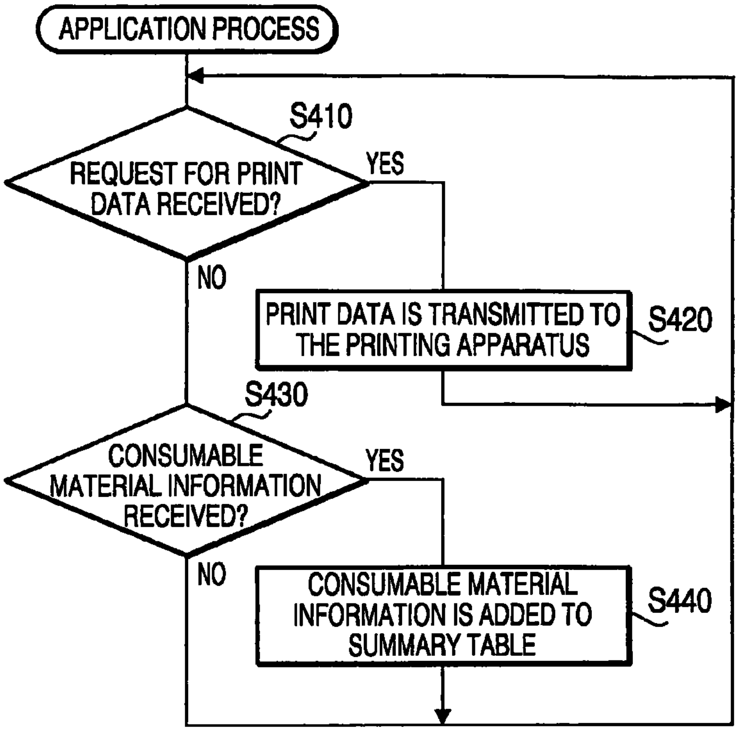
FIG. 6 is a flowchart to illustrate an application process executed by a control unit 41 of an application server 40 according to the embodiment of the invention.

Hereinafter, referring to FIG. 6, an application process to be executed by the control unit 41 of the application server 40 will be described. FIG. 6 is a flowchart to illustrate the application process according to the embodiment of the invention.

In S410, first, determination is made as to whether the request for the print data, which has been transmitted from the printing apparatus 10 in S40 of the printer process (see FIG. 3), is received in the communication unit 42 through the network 1. When the request is received (S410: YES), in S420, the print data corresponding to the request is read from the print data DB 44 in the storage unit 43 and transmitted to the printing apparatus 10 as a sender of the request. The process returns to S410.

In S410, when the request from the printing apparatus 10 is not received (S410: NO), in S430, determination is made as to whether the consumable material information is received in the communication unit 42 through the network 1. It should be noted that the consumable material information has been transmitted to the application server 40 and the accounting server 30 along with the supplier ID in S280 of the printing process (see FIG. 5). When the consumable material information is received (S430: YES), in S440, the consumable material information for each color is added in the summary table 45 (see FIG. 9) in the storage unit 43 on a supplier ID basis. The process thereafter returns to S410. When the consumable material information is not received in S430 (S430: NO), the process returns to S410.

Figure 7:
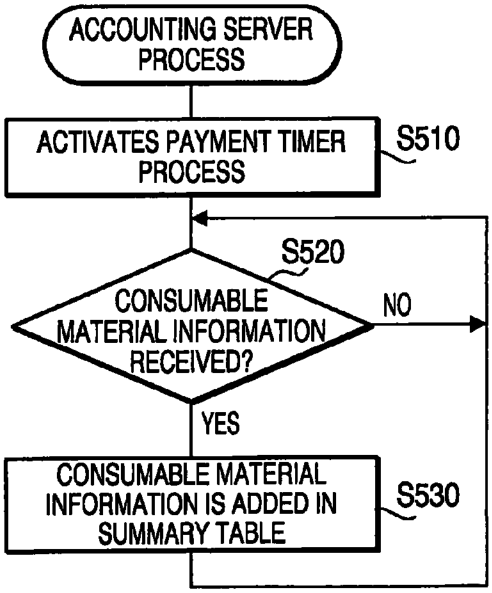
FIG. 7 is a flowchart to illustrate an accounting process executed by a control unit 31 of an accounting server 30 according to the embodiment of the invention.

Hereinafter, referring to FIG. 7, the accounting server process will be described in detail. FIG. 7 is a flowchart to illustrate the accounting process executed by the control unit 31 of the accounting server 30 according to the embodiment of the invention.

In S510, first, a payment timer process is activated. In the payment timer process, dividend dispensed to each supplier is calculated based on the consumable material information summarized in the summary table 34 of the storage unit 33 so that the dividend can be paid to the suppliers on a settlement day in each month. The payment timer process will be described in detail later.

Next, in S520, determination is made as to whether the consumable material information from the printing apparatus 10 is received. When the consumable material information is not received (S520: NO), the process repeats S520.

When the consumable material information is received (S520: YES), in S530, the consumable material information for each color is added in the summary table 34 (see FIG. 9) in the storage unit 33 on a supplier ID basis.

Hereinafter, referring to FIG. 9, the summary table 34 will be described in detail. FIG. 9 illustrates the summary table 34 according to the embodiment of the invention. The summary table 34 includes records wherein the areas printed in each color (C, M, Y, K) are summed up on a previously registered supplier ID basis, as the dividend to be dispensed to each contents supplier is calculated based on the sum of the areas printed. Further, in the summary table 34, account numbers of the contents suppliers to deposit the dividends are registered. It should be noted that the storage unit 43 of the application server 40 includes the summary table 45, which is similar to the summary table 34 of the accounting server 30, although the summary table 45 of the application server 40 may not include the accounting numbers.

Next, S530 in the accounting server process (see FIG. 7) will be described. In this step, a record corresponding to the supplier ID which has been received along with the consumable material information is searched. Further, as the record is found, values indicating areas printed in CMYK colors, which are included in the consumable material information, are added to the record, and values indicating the sum of the areas printed in CMYK colors are updated. The process returns to S520.

Figure 8:
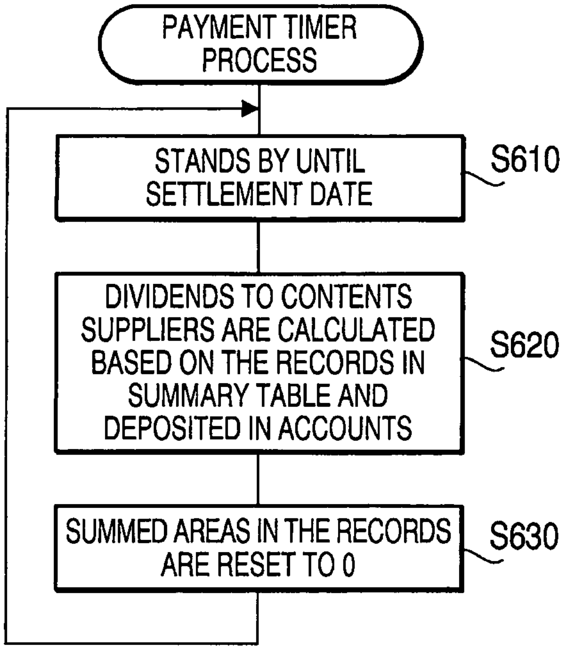
FIG. 8 is a flowchart to illustrate a payment timer process executed by the control unit 31 of the accounting server 30 according to the embodiment of the invention.

Hereinafter, referring to FIG. 8, the payment timer process will be described in detail. FIG. 8 is a flowchart to illustrate the payment timer process executed by the control unit 31 of the accounting server 30 according to the embodiment of the invention. The payment timer process is activated in S530 of the accounting server process as described above (see FIG. 7).

In S610, first, the process stands by until a predetermined settlement date (for example, end of a month) according to an internal calendar (not shown) equipped in the accounting server 30. In S620, on the settlement date, the dividend to be dispensed to each contents supplier is calculated based on the sum of the areas printed in CMYK colors stored in the records in the summary table 34. Further, the calculated dividends are deposited in the accounts of the contents suppliers via an online payment system.

The dividends in the present embodiment can be calculated in a following equation, for example. In this example, it is assumed that 2% of sales amount is dispensed to each supplier as the dividend, as the sales amount corresponds to the consumed amount of the image forming materials. That is:

$$\text{The dividend}=(\text{a sum of areas printed in } C\times\text{amount per unit area for } C+\text{a sum of areas printed in } M\times\text{amount per unit area for } M+\text{a sum of areas printed in } Y\times\text{amount per unit area for } Y+\text{a sum of areas printed in } K\times\text{amount per unit area for } K)\times 0.02.$$

As the dividends are deposited in the accounts of the contents supplier in S620, in S630, the values indicating the sum of the areas printed in CMYK colors in the summary table 34 are reset to 0. The process returns to S610.

According to the contents providing system 100 of the present embodiment as described above, the consumable material information concerning the consumed amount of the image forming materials used in printing the contents data in the printing apparatus 10 can be obtained so that the consumable material information can be summarized on a contents supplier basis by the accounting server 30. Further, payment of the dividends to the contents suppliers can be made based on the summarized result on the predetermined settlement day of a month so that the contents suppliers can be fairly benefited based on the contribution to the sales of the image forming materials used in the printing apparatus 10. Thus, the providers of the printing apparatus 10 can offer the contents suppliers the contents providing system 100 wherein the contents provides can easily participate. As the more contents data is supplied by the contents suppliers, the more the contents providing system 100 becomes beneficial to the users, and thus, opportunities wherein the users output the contents data by the printing apparatus 10 can increase.

In the present embodiment, the consumable material information obtained by the printing apparatus 10 is distributed to the application server 40 as well as the accounting server 30. Therefore, the contents suppliers as well as an administrator of the application server 40 can confirm the dividends and particulars according to the equation described above when the dividends are deposited to the contents suppliers. Accordingly, an unfair activity regarding the dividend calculation can be effectively avoided so that the contents suppliers participating in the contents providing system can be benefited in a fair manner. When the administrator of the application server 40 and the contents suppliers are not the same, the summarized results of the consumable material information can be notified to the suppliers from the application server 40 via a communication terminal using a communication network.

Although examples of carrying out the invention have been described, those skilled in the art will appreciate that there are numerous variations and permutations of the contents providing system that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, the consumable material information in the embodiment described above includes information regarding areas printed in CMYK colors as consumed amount of the image forming materials such as inks and toners, although the consumable material information may include information indicating amount of other consumed materials, such as a number of pixels printed, quantity of inks, and weights of inks or toners consumed.

Further, the consumable material information may be indicated by frequency to use exchangeable equipments that are exchanged after being operated for a predetermined number of time such as a drum in a laser printer and a recording head in an inkjet printer. In such cases, information indicating a number of printing operations and printed areas, for example, can be collected as the consumable material information so that the dividends to the contents suppliers can be calculated based on the collected consumable material information.

In the embodiment described above, the areas printed in CMYK colors are obtained based on the contents data before the contents data is printed. However, the consumable material information can be collected according to actual usage such as used amounts of inks and toners and areas of images actually printed.

Furthermore, the contents suppliers can be benefited by achieving various services such as discount in advertisement charge, for example. When the contents supplier is an individual, the used amount of the consumable materials may be exchanged with a reward that can be spent in online shopping for a frequent shopper program.

What is claimed is:

1. A contents providing system, comprising an application server, a printing apparatus, and an accounting server which are interconnected through a network, wherein the application server is configured to:

store a plurality of contents data, each contents data being stored in association with a contents supplier identifying information, respectively, the contents supplier identifying information indicating a supplier of the contents data; and transmit print data to the printing apparatus, the print data comprising contents data and the contents supplier identifying information stored in association with the contents data, wherein the printing apparatus is configured to:

receive the print data transmitted from the application server;

print an image of the contents data included in the received print data;

obtain particular consumable material information in association with a particular contents supplier identifying information, wherein the particular consumable material information indicates an amount of a consumable material consumed for printing the image of the contents data transmitted to the printing apparatus with the contents supplier identifying information; and transmit an information set to the accounting server without being transmitted through the application server, the information set including the particular contents supplier identifying information and the obtained particular consumable material information, and wherein the accounting server is configured to:

receive two or more the information sets transmitted from the printing apparatus;

generate a particular calculation result of the particular consumable material information, wherein the particular calculation result indicates a sum of the amount of the particular consumable material information, included in the two or more information sets, corresponding to the particular contents supplier identifying information;

store the generated particular calculation result in a storage device of the accounting server in association with the particular contents supplier identifying information;

determine a dividend for the particular contents supplier identifying information in accordance with the stored particular calculation result, wherein the dividend is determined in a manner that the sum of the amount of the particular consumable material information reflects the amount of the dividend for the particular contents supplier identifying information; and deposit the dividend to a bank account of the particular contents supplier identifying information.

2. The contents providing system according to claim 1, wherein the printing apparatus is further configured to transmit the information set to the application server, which has transmitted the print data to the printing apparatus, wherein the application server is further configured:

receive two or more information sets transmitted from the printing apparatus;

generate a second particular calculation result of the particular consumable material information, wherein the second particular calculation result indicates a sum of the amount of the particular consumable material information, included in the two or more information sets, corresponding to the particular contents supplier identifying information; and store the generated second particular calculation result in a storage device of the application server in association with the particular contents supplier identifying information.

3. The contents providing system according to claim 1, wherein the print data is described in extensible markup language (XML) and the contents data and the contents supplier identifying information are defined by <fragment> tag.

* * * * *

UNITED STATES PATENT AND TRADEMARK OFFICE

CERTIFICATE OF CORRECTION

PATENT NO. : 8,749,810 B2
APPLICATION NO. : 11/513237
DATED : June 10, 2014
INVENTOR(S) : Kiyotaka Ohara et al.

It is certified that error appears in the above-identified patent and that said Letters Patent is hereby corrected as shown below:

Title Page, should read:

item (12) United States Patent
Ohara et al.

item (75) Inventors: Kiyotaka Ohara, Aichi (JP)
Makoto Matsuda, North Brunswick; NJ (US)
Kazuma Aoki, Aichi (JP);
Satoshi Watanabe, Aichi (JP)

Signed and Sealed this
Twelfth Day of May, 2015

Michelle K. Lee
*Director of the United States Patent and Trademark Office*